(12) United States Patent
Mizuno et al.

(10) Patent No.: US 9,896,766 B2
(45) Date of Patent: Feb. 20, 2018

(54) SURFACE PROCESSING METHOD FOR ALUMINUM HEAT EXCHANGER

(71) Applicant: NIPPON PAINT SURF CHEMICALS CO., LTD., Tokyo (JP)

(72) Inventors: Akihiro Mizuno, Tokyo (JP); Norizumi Matsui, Tokyo (JP); Yuko Wada, Tokyo (JP)

(73) Assignee: NIPPON PAINT SURF CHEMICALS CO., LTD., Tokyo (JP)

( * ) Notice: Subject to any disclaimer, the term of this patent is extended or adjusted under 35 U.S.C. 154(b) by 351 days.

(21) Appl. No.: 14/781,856

(22) PCT Filed: Apr. 3, 2014

(86) PCT No.: PCT/JP2014/059901
§ 371 (c)(1),
(2) Date: Oct. 1, 2015

(87) PCT Pub. No.: WO2014/163166
PCT Pub. Date: Oct. 9, 2014

(65) Prior Publication Data
US 2016/0060765 A1    Mar. 3, 2016

(30) Foreign Application Priority Data

Apr. 3, 2013  (JP) ................. 2013-078004

(51) Int. Cl.
| | | |
|---|---|---|
| *C23C 22/80* | (2006.01) | |
| *C23C 22/40* | (2006.01) | |
| *C23C 22/82* | (2006.01) | |
| *C23C 22/34* | (2006.01) | |
| *C23C 22/44* | (2006.01) | |
| *C23C 22/74* | (2006.01) | |
| *F28F 19/06* | (2006.01) | |
| *F28F 21/08* | (2006.01) | |
| *F28F 19/02* | (2006.01) | |
| *C09D 5/08* | (2006.01) | |
| *C23C 22/00* | (2006.01) | |
| *B05D 3/10* | (2006.01) | |

(52) U.S. Cl.
CPC .............. *C23C 22/34* (2013.01); *C09D 5/084* (2013.01); *C23C 22/40* (2013.01); *C23C 22/44* (2013.01); *C23C 22/74* (2013.01); *C23C 22/82* (2013.01); *F28F 19/02* (2013.01); *F28F 19/06* (2013.01); *F28F 21/084* (2013.01); *B05D 3/102* (2013.01); *B05D 2202/25* (2013.01); *F28F 2245/02* (2013.01)

(58) Field of Classification Search
None
See application file for complete search history.

(56) References Cited

U.S. PATENT DOCUMENTS

| | | |
|---|---|---|
| 4,992,115 A | 2/1991 | Ikeda |
| 6,361,833 B1 | 3/2002 | Nakada et al. |
| 6,554,916 B2 | 4/2003 | Kojima et al. |
| 6,869,677 B1 | 3/2005 | Uehara et al. |
| 7,503,381 B2 | 3/2009 | Inbe et al. |
| 2002/0040702 A1 | 4/2002 | Kojima et al. |
| 2003/0098091 A1 | 5/2003 | Opdycke et al. |
| 2003/0168127 A1 | 9/2003 | Hamamura et al. |
| 2003/0209293 A1 | 11/2003 | Sako et al. |
| 2003/0213533 A1 | 11/2003 | Sako et al. |
| 2006/0027629 A1 | 2/2006 | Inbe et al. |
| 2010/0170594 A1 | 7/2010 | Inbe et al. |
| 2013/0034743 A1 | 2/2013 | Bannai et al. |
| 2013/0284049 A1 | 10/2013 | Miura et al. |

FOREIGN PATENT DOCUMENTS

| | | |
|---|---|---|
| CN | 1323976 A | 11/2001 |
| CN | 1330729 A | 1/2002 |
| CN | 1730725 A | 2/2006 |
| EP | 1 136 591 A1 | 9/2001 |
| EP | 1324274 A2 | 7/2003 |
| JP | 1-208477 A | 8/1989 |
| JP | 2000-199077 A | 7/2000 |
| JP | 2000-345362 A | 12/2000 |
| JP | 2001-181860 A | 7/2001 |
| JP | 2002-030460 A | 1/2002 |
| JP | 2002-60699 A | 2/2002 |
| JP | 2002-275650 A | 9/2002 |
| JP | 2004-510882 A | 4/2004 |
| JP | 2004-270030 A | 9/2004 |
| JP | 2005-008975 A | 1/2005 |
| JP | 2005-36161 A | 2/2005 |
| JP | 2006-69197 A | 3/2006 |
| JP | 2007-238976 A | 9/2007 |
| JP | 2008-088552 A | 4/2008 |
| JP | 2008-231418 A | 10/2008 |
| JP | 2009-034589 A | 2/2009 |
| JP | 2009-132952 A | 6/2009 |

(Continued)

OTHER PUBLICATIONS

International Search Report for International Application No. PCT/JP2012/074059 dated Dec 25, 2012 (5 pgs.).

(Continued)

*Primary Examiner* — Lois L Zheng
(74) *Attorney, Agent, or Firm* — Muncy, Geissler, Olds & Lowe P.C.

(57) ABSTRACT

Provided is a surface processing method for an aluminum heat exchanger, by which odor can be suppressed and which enables the aluminum heat exchanger to exhibit corrosion resistance and moisture resistance that are excellent to conventional art. The surface processing method for an aluminum heat exchanger uses a chemical conversion treatment agent that includes: one, or two or more type of a metallic element (A) selected from a group comprising of zirconium, titanium, and hafnium; vanadium element (B); and a resin (C). The resin (C) includes a polyvinyl alcohol resin (C1). The ratio (Wa/Wb) of the weight-based total content (Wa) of the metallic element (A) relative to the weight-based content (Wb) of vanadium element (B) is 0.1-15, and the ratio ((Wa+Wb)/Wc1) of the weight-based total content (Wa+Wb) of the metallic element (A) and vanadium element (B) relative to the weight-based total content (Wc1) of the polyvinyl alcohol resin (C1) is 0.25-15.

7 Claims, No Drawings

(56) References Cited

FOREIGN PATENT DOCUMENTS

| | | |
|---|---|---|
| JP | 2010-261058 A | 11/2010 |
| JP | 2011-042842 A | 3/2011 |
| JP | 2011-131206 A | 7/2011 |
| JP | 2011-161876 A | 8/2011 |
| JP | 2011-195942 A | 10/2011 |
| JP | 2011-214105 A | 10/2011 |
| JP | 2012-017524 A | 1/2012 |
| WO | WO 00/22188 A1 | 4/2000 |
| WO | WO 02/28550 A1 | 4/2002 |
| WO | WO 2011/065482 A1 | 6/2011 |
| WO | WO 2011/099460 A1 | 8/2011 |

OTHER PUBLICATIONS

International Search Report for International Application No. PCT/JP2013/056547 dated May 28, 2013 (5 pgs.).

Office Action for Chinese Patent Application No. 201280045677.6 dated Mar. 26, 2015 (8 pgs.).

Office Action for Chinese Patent Application No. 201380012367.9 dated Aug. 21, 2015 (6 pgs.).

Notification that the Japan Patent Office has received an Information Statement by a third party issued to Japanese Application No. 2011-205809 dated Oct. 27, 2015 (5 pgs.).

Office Action for U.S. Appl. No. 14/346,132 dated May 20, 2016 (10 pgs.).

Office Action for U.S. Appl. No. 14/382,922 dated Jun. 6, 2016 (10 pgs.).

Notification that the Japan Patent Office has received an Information Statement by a third party issued to Japanese Application No. 2013-047340 dated Jul. 19, 2016 (3 pgs.).

Office Action for Czech Patent Application No. 2014-179 dated Jul. 25, 2016 (7 pgs.).

Office Action for Japanese Patent Application No. 2013-047340 dated Oct. 18, 2016.

Office Action dated Nov. 2, 2016 in corresponding Chinese Patent Application No. 201480019222.6.

SURFACE PROCESSING METHOD FOR ALUMINUM HEAT EXCHANGER

TECHNICAL FIELD

The present invention relates to a surface treatment method for an aluminum heat exchanger.

BACKGROUND ART

In general, narrowly-spaced multiple fins are arranged in an aluminum heat exchanger in order to maximize the surface area thereof, and refrigerant circulation tubes are arranged on the fins in an intricate pattern in view of improved heat exchange efficiency. In the case of a heat exchanger with such a complicated structure, when atmospheric moisture adheres on a surface of a fin or a tube (hereinafter, referred to as a "fin and the like") as condensed water, this condensed water may stay on the surface of a fin and the like for a long time. If this occurs, an oxygen concentration cell may locally be formed to promote a corrosion reaction, resulting in the development of white rust.

Accordingly, as a technology for improving the corrosion resistance of a surface of an aluminum material, known is a method in which a chemical conversion coating film is formed by allowing the surface to contact with a chemical conversion agent. For example, as a chemical conversion agent which can be applied to a fin in an aluminum heat exchanger, proposed is a chemical conversion agent including a zirconium compound, a titanium compound, a vanadium compound and polyvinyl alcohol (see Patent Document 1). According to this technology, the chemical conversion agent can be applied on a surface of a metal substrate to supposedly improve the corrosion resistance thereof.

In recent years, the improvement in blackening resistance (hereinafter referred to as "moisture resistance") has also been emphasized in addition to the improvement in corrosion resistance for aluminum heat exchangers. Herein, an indicator of corrosion resistance is white rust, whereas, an indicator of moisture resistance is blackening. White rust is a corrosion phenomenon generated by a corrosion factor such as oxygen, water, and chloride ions, whereas, blackening is a corrosion phenomenon generated by the existence of oxygen, water, and heat.

Meanwhile, in a case where the corrosion resistance and moisture resistance of a chemical conversion coating film formed on a surface of an aluminum heat exchanger is not sufficient, the moisture adhered on a surface of a fin and the like may promote corrosion on an aluminum surface, resulting in the development of white rust and blackening. Mineral components increases as this occurs, and they themselves generate or adsorb odors. In particular, odor generation is a serious problem for a heat exchanger used in an air conditioner. Although a hydrophilic coating film is usually formed on a chemical conversion coating film in a heat exchanger, odors of inorganic matters resulted from corrosion can not be suppressed by this hydrophilic coating film. Therefore, in order to suppress odors, it is essential to suppress the corrosion on an aluminum surface by enhancing the corrosion resistance and moisture resistance of a chemical conversion coating film formed with a chemical conversion agent.

Note that a technology of forming a hydrophilic coating film on a surface of an aluminum heat exchanger is known in which a component for forming a hydrophilic coating film comprising polyvinyl alcohol in addition to a metal from a zirconium compound, a vanadium compound and the like (see Patent Documents 2 and 3).

Patent Document 1: Japanese Unexamined Patent Application, Publication No. 2008-231418
Patent Document 2: Japanese Unexamined Patent Application, Publication No. 2000-345362
Patent Document 3: PCT International Publication No. WO2000/022188

DISCLOSURE OF THE INVENTION

Problems to be Solved by the Invention

Thus, there is required a further improvement in corrosion resistance and moisture resistance of an aluminum heat exchanger. However, the currently available technology described in Patent Document 1 only provides a less than satisfactory corrosion resistance and moisture resistance of an aluminum heat exchanger. Note that the technology disclosed in Patent Document 1 does not describe studies about moisture resistance, and thus shall not be considered as a technology for improving moisture resistance.

Further, technologies described in Patent Documents 2 and 3, which are both related to a hydrophilic coating film formed on a chemical conversion coating film, are mainly intended for improving hydrophilic properties of an aluminum heat exchanger, and thus significantly differ from the present invention.

The present invention is made in view of the above situations. Accordingly, an object of the present invention is to provide a surface treatment method for an aluminum heat exchanger which can confer an excellent corrosion resistance and moisture resistance and odor suppressing capability on the aluminum heat exchanger as compared with the conventional method.

Means for Solving the Problems

In order to achieve the above object, the present invention provides a surface treatment method for an aluminum heat exchanger, the method comprising the steps of:
(a) treating a surface of the aluminum heat exchanger with a chemical conversion agent to form a chemical conversion coating film on the surface of the aluminum heat exchanger,
(b) allowing the aluminum heat exchanger on the surface of which the chemical conversion coating film has been formed at the above step (a) to contact with a hydrophilic agent including a hydrophilic resin, and
(c) performing a baking treatment on the aluminum heat exchanger which has been allowed to contact with the hydrophilic agent at the above step (b) to form a hydrophilizing coating film,
wherein the chemical conversion agent comprises one, or two or more metal elements (A) selected from the group consisting of zirconium, titanium and hafnium,
vanadium element (B), and
a resin (C), and
the resin (C) comprises a polyvinyl alcohol based resin (C1) comprising at least of one of polyvinyl alcohol and a derivative thereof, and
the value of a ratio (Wa/Wb) of the mass-based total content (Wa) of the metal element (A) to the mass-based content (Wb) of the vanadium element (B) is 0.1 to 15, and
the value of a ratio ((Wa+Wb)/Wc1) of the mass-based total content (Wa+Wb) of the metal element (A) and the vanadium element (B) to the mass-based total content (Wc1) of the polyvinyl alcohol based resin (C1) is 0.25 to 15.

Preferably, the resin (C) further comprises one, or two or more metal ion-cross linkable polymers (C2), and the value of a ratio (Wc2/(Wc1 +Wc2)) of the mass-based total content (Wc2) of the metal ion-cross linkable polymer (C2) to the mass-based total content (Wc1+Wc2) of the polyvinyl alcohol-based resin (C1) and the metal ion-cross linkable polymer (C2) is preferably 0.4 or less.

The above chemical conversion agent preferably comprises one, two or more polymers selected from the group consisting of polyacrylic acid, phosphoric acid polymer, phosphoric acid polymer, water-soluble or water-dispersible epoxy polymer, water-soluble or water-dispersible urethane based polymer and polyester as the above metal ion-cross linkable polymer (C2).

Preferably, the concentration of the above metal element (A) in the chemical conversion agent is 50-100,000 ppm by mass, and the concentration of the above vanadium element (B) is 50-100,000 ppm by mass, and the total concentration of the above resin (C) is 50-100,000 ppm by mass, and pH is 0.5 to 6.5.

The average saponification degree of the above polyvinyl alcohol based resin (C1) is preferably 80% or more.

Preferably, the above chemical conversion agent further comprises a surfactant.

Preferably, the above chemical conversion agent further comprises one, or two or more sources of free fluorine selected from the group consisting of hydrofluoric acid, ammonium fluoride, ammonium hydrogen fluoride and fluorides of alkali metals.

Provided is an aluminum heat exchanger treated by the surface treatment method for an aluminum heat exchanger according to the present invention.

Effects of the Invention

The present invention can provide a surface treatment method for an aluminum heat exchanger which can confer an excellent corrosion resistance and moisture resistance and odor suppressing capability on the aluminum heat exchanger as compared with the conventional method.

PREFERRED MODE FOR CARRYING OUT THE INVENTION

Below, embodiments of the present invention will be described in detail.

The surface treatment method for an aluminum heat exchanger used in the present embodiment comprises the steps of:
(a) treating a surface of the aluminum heat exchanger with a chemical conversion agent to form a chemical conversion coating film on the surface of the aluminum heat exchanger,
(b) allowing the aluminum heat exchanger on the surface of which the chemical conversion coating film has been formed at the above step (a) to contact with a hydrophilic agent including a hydrophilic resin, and
(c) performing a baking treatment on the aluminum heat exchanger which has been allowed to contact with the hydrophilic agent at the above step (b) to form a hydrophilizing coating film, wherein the chemical conversion agent comprises one, or two or more metal elements (A) selected from the group consisting of zirconium, titanium and hafnium,
vanadium element (B) and
a resin (C), and
the resin (C) comprises a polyvinyl alcohol based resin (C1) comprising at least of one of polyvinyl alcohol and a derivative thereof, and
the value of a ratio (Wa/Wb) of the mass-based total content (Wa) of the metal element (A) to the mass-based content (Wb) of the vanadium element (B) is 0.1 to 15, and
the value of a ratio ((Wa+Wb)/Wc1) of the mass-based total content (Wa+Wb) of the metal element (A) and the vanadium element (B) to the mass-based total content (Wc1) of the polyvinyl alcohol based resin (C1) is 0.25 to 15.

An aluminum heat exchanger treated by the surface treatment method for an aluminum heat exchanger used in the present embodiment is preferably used for an automobile air conditioner. The term "aluminum product" used herein means that the product comprises aluminum or an aluminum alloy (hereinafter, simply referred to as "aluminum").

As described above, narrowly-spaced multiple fins are arranged in a heat exchanger in order to maximize the surface area thereof, and refrigerant circulation tubes are arranged on the fins in an intricate pattern in view of improved heat exchange efficiency.

The surface treatment method for an aluminum heat exchanger used in the present embodiment comprises the step (a) of treating a surface of the aluminum heat exchanger with a chemical conversion agent to form a chemical conversion coating film on the surface of the aluminum heat exchanger.

At the step (a) in the above surface treatment method for an aluminum heat exchanger, the chemical conversion agent is allowed to contact with the surface of the aluminum heat exchanger. The chemical conversion agent used in the aforementioned step (a) (which is, as used herein, also referred to as the "chemical conversion agent used in the present embodiment.") is a coating type chemical conversion agent comprising one, or two or more metal elements (A) selected from the group consisting of zirconium, titanium and hafnium; and vanadium element (B); and a resin (C). A coating type chemical conversion agent is used according to a method in which the coating type chemical conversion agent is applied on a metal surface, and then the metal surface is dried without washing with water. Conventionally, a pickling step of removing an oxide film on a surface and a water-washing step after the pickling step are required before a chemical conversion agent is applied on a surface of an aluminum heat exchanger to provide corrosion resistance. In contrast, the chemical conversion agent according to the present invention can provide a chemical conversion coating film with a high barrier property, and the chemical conversion agent may be applied on a surface of an aluminum heat exchanger. Therefore, a high corrosion resistance and moisture resistance can be obtained without removing an oxide film. Further, in a case where a coating type chemical conversion agent is used, a pickling step and a water-washing step after the pickling step do not need to be provided, and further the number of steps can be reduced.

In the chemical conversion agent of the present embodiment, all of zirconium, titanium, hafnium, and vanadium exist as various ions such as complex ions. Therefore, as used herein, the content of each of zirconium, titanium, hafnium and vanadium means a value expressed in terms of a metal element of various ions.

The chemical conversion agent used in the present embodiment may be prepared by dissolving one, or two or more compounds selected from the group consisting of a zirconium based compound, a titanium based compound and a hafnium based compound; a vanadium based compound; and a polyvinyl alcohol based resin (C1) in water.

Examples of the zirconium-based compound as a supply source of zirconium ions include zirconium compounds such as fluorozirconic acid and zirconium fluoride; and salts thereof of lithium, sodium, potassium, ammonium, and the like. It is also possible to use those prepared by dissolving a zirconium compound such as zirconium oxide with a fluoride such as hydrofluoric acid. It is also possible to use zirconium carbonate, zirconium nitrate, and an organic zirconium complex.

Examples of the titanium-based compound as a supply source of titanium ions include titanium compounds such as fluorotitanic acid and titanium fluoride; and salts thereof of lithium, sodium, potassium, ammonium, and the like. It is also possible to use those prepared by dissolving a titanium compound such as titanium oxide with a fluoride such as hydrofluoric acid. It is also possible to use titanium carbonate, titanium nitrate, and an organic titanium complex.

Examples of the hafnium-based compound as a supply source of hafnium ions include hafnium compounds such as fluorohafnium acid and hafnium fluoride; and salts thereof of lithium, sodium, potassium, ammonium, and the like. It is also possible to use those prepared by dissolving a hafnium compound such as hafnium oxide with a fluoride such as hydrofluoric acid.

The concentration of one, or two or more metal elements (A) selected from the group consisting of zirconium, titanium and hafnium included in the chemical conversion agent used in the present embodiment is preferably 50 to 100,000 ppm by mass, more preferably 400 to 12,000 ppm by mass, even more preferably 500 to 5,000 ppm by mass in terms of metal element. In a case where the concentration of the metal element (A) is less than 50 ppm by mass, the corrosion resistance of a chemical conversion coating film tends to be reduced. On the other hand, in a case where the concentration of the metal element (A) is more than 100,000 ppm by mass, the liquid stability of a chemical conversion agent tends to be reduced.

Vanadium ions supplied from the vanadium element (B) is a component which can improve the corrosion resistance of a chemical conversion coating film along with zirconium ions. Vanadium, which is insolubilized in nature by a reduction reaction, can effectively cover segregated substances and the vicinity thereof which may serve as an initiation point of corrosion.

The above chemical conversion agent comprises one, or two or more kinds of metal ions selected from the group consisting of zirconium ions, titanium ions and hafnium ions; and vanadium ions. Therefore, a chemical conversion coating film comprising one, or two or more metals selected from the group consisting of zirconium, titanium and hafnium; and vanadium is formed. By using the above chemical conversion agent comprising one, or two or more kinds of metal ions selected from the group consisting of zirconium ions, titanium ions and hafnium ions; and vanadium ions as active species, a denser chemical conversion coating film having a high coatability is formed on a surface of an aluminum heat exchanger.

Divalent to pentavalent vanadium compounds can be used as a vanadium based compound serving as a source of vanadium ions. Specific examples include metavanadinic acid, ammonium metavanadate, sodium metavanadate, vanadium pentoxide, vanadium oxytrichloride, vanadyl sulfate, vanadyl nitrate, vanadyl phosphate, vanadium oxide, vanadium dioxide, vanadium oxyacetylacetonate, vanadium oxyisopropoxide, vanadium chloride and the like. In the present embodiment, tetravalent or pentavalent vanadium compounds are preferred, and specifically, vanadyl sulfate (tetravalent) and ammonium metavanadate (pentavalent) are preferably used.

The concentration of the vanadium element (B) included in the chemical conversion agent used in the present embodiment is preferably 50 to 100,000 ppm by mass, more preferably 400 to 9,000 ppm by mass, even more preferably 500 to 5000 ppm by mass in terms of vanadium element in view of that the corrosion resistance of an aluminum heat exchanger subjected to a chemical conversion treatment can be improved.

As described above, in the chemical conversion agent used in the present embodiment, the value of a ratio (Wa/Wb) of the mass-based total content (Wa) of one, or two or more metal elements (A) selected from the group consisting of zirconium, titanium and hafnium to the mass-based content (Wb) of the vanadium element (B) is 0.1 to 15. In a case where the above (Wa/Wb) is less than 0.1, the corrosion resistance and moisture resistance is decreased. In a case where the above (Wa/Wb) is 15 or more, the corrosion resistance is decreased.

Further, the value of a ratio (Wa/Wb) of the mass-based total content (Wa) of the metal element (A) to the mass-based content (Wb) of the vanadium element (B) is preferably 0.1 to 9.5, more preferably 0.15 to 6.5 in view of that the above effect can further be enhanced.

As described above, the chemical conversion agent used in the present embodiment comprises the resin (C). The resin (C) is a film-forming component.

The resin (C) comprises the polyvinyl alcohol based resin (C1) comprising at least one of polyvinyl alcohol and a derivative thereof. The polyvinyl alcohol based resin is typically polyvinyl alcohol (PVA) obtained by saponificating a vinyl acetate polymer. Further, derivatives of PVA, for example, those in which some of the hydroxy groups are replaced with alkyl groups such as propyl groups and butyl groups; and acetoacetyl groups can also be used as derivatives of polyvinyl alcohol. In a case where the chemical conversion agent comprises the polyvinyl alcohol based resin (C1) comprising at least one of polyvinyl alcohol and a derivative thereof, the hydroxy groups of the polyvinyl alcohol based resin (C1) are cross-linked with the one, or two or more metal elements selected from the group consisting of zirconium, titanium and hafnium; and the vanadium element (B) in the chemical conversion agent to strengthen the chemical conversion coating film, and at the same time, to fix these metals in the chemical conversion coating film to form a dense chemical conversion coating film, thereby improving the corrosion resistance of the chemical conversion coating film. The formation of a dense metal surface film can confer an excellent corrosion resistance and moisture resistance on an aluminum heat exchanger. Note that a PVA having a modification degree of less than 20 mol % is used as the polyvinyl alcohol based resin (C1) in a case where a derivative of PVA is used. In a case where a PVA having a modification degree of 20 mol % or more is used as the polyvinyl alcohol based resin (C1), the corrosion resistance and moisture resistance of an aluminum heat exchanger on which a chemical conversion coating film is formed tend to be decreased because the amount of hydroxy groups to be coordinated with metal ions in the chemical conversion agent is small.

Note that polyvinyl alcohol and a derivative thereof, which have an excellent film-forming property because of high crystallinity and do not have carboxyl groups and the like, do not have a strong odor generated from a resin, and do not adsorb odorants.

The average saponification degree of the polyvinyl alcohol based resin (C1) is preferably 80% or more, more preferably 90% or more, even more preferably 98% or more. In a case where the saponification degree of the polyvinyl alcohol based resin (C1) is less than 80%, the film-forming property of a chemical conversion agent is decreased due to decreased crystallinity. Therefore, the corrosion resistance and moisture resistance of an aluminum heat exchanger on which a metal surface film is formed tend to be inferior.

Further, in the case of the average saponification degree is less than 80%, the polyvinyl alcohol based resin (C1) also tends to have a stronger acetic-acid like odor from vinyl acetate. Examples of commercial products of polyvinyl alcohol and derivatives thereof include PVA-105 (polyvinyl alcohol, saponification degree: 98 to 99%, polymerization degree: 500, Kuraray Co., Ltd.), PVA-110 (polyvinyl alcohol, saponification degree: 98 to 99%, polymerization degree: 1,000, Kuraray Co., Ltd.), PVA-405 (polyvinyl alcohol, saponification degree: 80 to 83%, polymerization degree: 500, Kuraray Co., Ltd.), Gohsefimer Z-200 (acetoacetyl-modified polyvinyl alcohol, saponification degree: 99%, polymerization degree: 1,100, acetoacetyl group modification degree: 4 to 5 mol %, The Nippon Synthetic Chemical Industry Co., Ltd.) and the like.

The average saponification degree is the value calculated by the weighted average. For example, when polyvinyl alcohol having a saponification degree of 90% is mixed with polyvinyl alcohol having a saponification degree of 98% in a mass ratio of 6/4, the average saponification degree of the entire resin mixture is 93.2%.

The polymerization degree of the polyvinyl alcohol based resin (C1) included in the chemical conversion agent used in the present embodiment is preferably 100 to 5,000. In a case where polymerization degree of the polyvinyl alcohol based resin (C1) is 100 to 5,000, a robust chemical conversion coating film can be formed, and the corrosion resistance of the chemical conversion coating film can be enhanced.

As described above, in the chemical conversion agent used in the present embodiment, the value of a ratio ((Wa+Wb)/Wc1) of the mass-based total content (Wa+Wb) of one, or two or more metal elements (A) selected from the group consisting of zirconium, titanium and hafnium; and the vanadium element (B) to the mass-based total content (Wc1) of the polyvinyl alcohol based resin (C1) is 0.25 to 15. In a case where the above ratio is less than 0.25, a metal cross-linking is weak, and thus the corrosion resistance and moisture resistance is decreased. In a case where the above ratio is 15 or more, a film is not sufficiently formed, and thus the moisture resistance is decreased.

Further, the value of a ratio ((Wa+Wb)/Wc1) of the mass-based total content (Wa+Wb) of the metal element (A) and the vanadium element (B) to the mass-based total content (Wc1) of the polyvinyl alcohol based resin (C1) is preferably 0.25 to 10, more preferably 0.3 to 6 in view of that the above effect is further enhanced.

The resin (C) included in the above chemical conversion agent may further comprise one, or two or more metal ion-cross linkable polymer (C2). The metal ion-cross linkable polymer (C2) is a polymer which forms a cross-link with an metal ion. Examples of the metal ion-cross linkable polymer (C2) include polyacrylic acid, phosphoric acid polymer, phosphoric acid polymer, water-soluble or water-dispersible epoxy polymer, water-soluble or water-dispersible urethane based polymer, polyester, water-soluble or water-dispersible polyolefine and the like. The metal ion-cross linkable polymer (C2) can form a cross-link with a metal ion of zirconium and vanadium in the chemical conversion coating film, and thus suppress the dissolution of the chemical conversion coating film, leading to improved corrosion resistance. The above resin (C) as a film-forming component preferably consists only of the polyvinyl alcohol based resin (C1) and the one, or two or more metal ion-cross linkable polymers (C2). In contrast, other than resins of polyacrylic acid and the like recited above, for example, resins of polyethylene oxide, polyethylene glycol, polyacrylic sulfone, polystyrene sulfonate and the like have a low cross-linking capability with metal ions. Therefore, in a case where a resin of other than polyacrylic acid and the like recited above (polyethylene oxide and the like) is used as a metal ion-cross linkable polymer, the resulting chemical conversion coating film tends to dissolve, resulting in decreased corrosion resistance.

The above chemical conversion agent preferably comprises one, or two or more selected from the group consisting of polyacrylic acid, phosphoric acid polymer, phosphoric acid polymer, water-soluble or water-dispersible epoxy polymer, water-soluble or water-dispersible urethane based polymer and polyester as a metal ion-cross linkable polymer (C2) in view of that the corrosion resistance of an aluminum heat exchanger can be improved. Examples of commercial products of the metal ion-cross linkable polymer (C2) include AC1OL (polyacrylic acid, Toagosei Co., Ltd.), Polyphosmer (phosphoric acid polymer, DAP Co., Ltd.) and the like.

In the above chemical conversion agent, the value of a ratio (Wc2/(Wc1+Wc2)) of the mass-based total content (Wc2) of the metal ion-cross linkable polymer (C2) to the mass-based total content (Wc1+Wc2) of the polyvinyl alcohol based resin (C1) and the metal ion-cross linkable polymer (C2) is preferably 0.4 or less, more preferably 0.2 or less, even more preferably 0.1 or less. In a case where a value of the above ratio (Wc2/(Wc1+Wc2)) is more than 0.4, the amount of hydroxy groups present in the resin is small, and the corrosion resistance and moisture resistance of an aluminum heat exchanger on which a chemical conversion coating film is formed tends to be decreased.

The above chemical conversion agent preferably includes only the polyvinyl alcohol based resin (C1) and the metal ion-cross linkable polymer (C2) as the resin (C). In a case where the above chemical conversion agent includes only the polyvinyl alcohol based resin (C1) and the metal ion-cross linkable polymer (C2) as the resin (C), metal cross-linkings in a chemical conversion coating film becomes stronger, improving the corrosion resistance and moisture resistance of a metal material on which the chemical conversion coating film is formed.

Note that the phrase that the chemical conversion agent "includes only the polyvinyl alcohol based resin (C1) and the metal ion-cross linkable polymer (C2) as the resin (C)" does not exclude a case where the chemical conversion agent includes some resins in addition to the polyvinyl alcohol based resin (C1) and the metal ion-cross linkable polymer (C2). Specifically, the phrase "includes only the polyvinyl alcohol based resin (C1) and the metal ion-cross linkable polymer (C2)" refers to a case where the content of resins other than the polyvinyl alcohol based resin (C1) and the metal ion-cross linkable polymer (C2) in the chemical conversion agent is 5 mass % or less relative to the mass-based total content (Wc1+Wc2) of the polyvinyl alcohol based resin (C1) and the metal ion-cross linkable polymer (C2).

The total concentration of the resin(s) (C) included in the above chemical conversion agent is preferably 50 to 100,000 ppm by mass, more preferably 400 to 50,000 ppm by mass, even more preferably 1,000 to 20,000 ppm by mass in view of that the corrosion resistance of an aluminum heat exchanger on which chemical conversion is performed.

In order to improve corrosion resistance, the above chemical conversion agent may comprise metal ions of manganese, zinc, cerium, trivalent chromium, magnesium, strontium, calcium, tin, copper, iron and silicon compounds; phosphorus compounds of phosphoric acid, condensed phosphoric acid and the like; and various silane coupling agents such as aminosilane and epoxysilane in order to improve adhesiveness.

The chemical conversion agent used in the present embodiment may also comprise aluminum ions.

Examples of a source of aluminum ions include aluminates such as aluminum nitrate, aluminum sulfate, aluminum fluoride, aluminum oxide, alum, aluminum silicate and sodium aluminate; and fluoroaluminum salts such as sodium fluoroaluminate and the like.

Preferably, the chemical conversion agent used in the present embodiment further comprises one, or two or more sources of free fluorine selected from the group consisting of hydrofluoric acid, ammonium fluoride, ammonium hydrogen fluoride and fluorides of alkali metals. In a case where the chemical conversion agent further comprises these sources of free fluorine, the concentration of free fluoride ions in the chemical conversion agent is increased, and etching on a surface of an aluminum heat exchanger in the early stage of the step (a) can be promoted, leading to improved corrosion resistance and moisture resistance of the aluminum heat exchanger after the surface treatment. More specifically, as described above, narrowly-spaced multiple fins are arranged in an aluminum heat exchanger, and refrigerant supplying tubes are arranged on these fins in an intricate pattern. In order to sufficiently etch a surface of a fin arranged in a narrow interval and a surface of a tube in an intricate pattern, it is preferred that the chemical conversion agent further comprises a source of free fluorine ions.

Note that zirconium fluoride, titanium fluoride and the like which are ionized to produce free fluorine ions may also be used as sources of zirconium ions and titanium ions, but the source of fluorine ions in the present embodiment is not the same as those of zirconium ions and titanium ions. In a case where the chemical conversion agent used in the present embodiment comprises a source of free fluorine apart from sources of zirconium ions and titanium ions, the concentration of fluoride ions will be high enough to promote etching of a surface of an aluminum heat exchanger.

Examples of a fluoride of an alkali metal used as a source of free fluorine ions include sodium fluoride, sodium hydrofluorate, potassium fluoride, and potassium hydrofluorate.

The concentration of a source of free fluorine ions included in a chemical conversion agent preferably 500 to 20,000 ppm by mass in terms of fluorine element. In a case where the concentration of a source of free fluorine ions in a chemical conversion agent is less than 500 ppm by mass in terms of fluorine element, the corrosion resistance and moisture resistance of an aluminum heat exchanger after the surface treatment tend to be decreased. In a case where it is higher than 20,000 ppm by mass, etching of a surface of an aluminum heat exchanger tends to be difficult to control. The concentration of a source of free fluorine ions included in a chemical conversion agent is preferably 500 to 10,000 ppm in terms of fluorine element, more preferably 500 to 5,000 ppm.

The chemical conversion agent used in the present embodiment may comprise a surfactant in addition to the resin (C) as a film-forming component. The content of a surfactant in a chemical conversion agent is preferably 5 mass % or less relative to the solid content in the chemical conversion agent. In a case where the chemical conversion agent comprises a surfactant in the above range, wettability tends to be good, and the chemical conversion agent can easily be applied. The surfactant included in the chemical conversion agent may be any of a cationic surfactant, a non-ionic surfactant and an anionic surfactant. Further, as a surfactant included in a chemical conversion agent, a non-ionic surfactant is preferred.

Further the pH of a chemical conversion agent is preferably 0.5 to 6.5, more preferably 1 to 5. In a case where the pH of the chemical conversion agent is smaller than 0.5 or larger than 6.5, a good chemical conversion coating film is not formed, and the corrosion resistance and moisture resistance of an aluminum heat exchanger tend to be decreased.

The surface treatment method for an aluminum heat exchanger according to the present embodiment can be performed by using the chemical conversion agent used in the present embodiment having the above constitution.

At the step (a) in the surface treatment method for an aluminum heat exchanger used in the present embodiment, a chemical conversion agent applied on a surface of the aluminum heat exchanger is dried (which corresponds to the first drying step described below) to form a chemical conversion coating film on the above surface.

In the surface treatment method for an aluminum heat exchanger used in the present embodiment, a hot-water washing step of washing the surface of the aluminum heat exchanger and a degreasing step of degreasing the surface of the aluminum heat exchanger in order to remove fouling and the like adhering to the aluminum heat exchanger may be provided before performing the step (a). When performing the hot-water washing step, warm water at 40 to 90° C. is preferably used.

Further, in the above surface treatment method for an aluminum heat exchanger, a pickling step of removing an oxide film on the surface of the aluminum heat exchanger and a water-washing step after the pickling step do not need to be provided.

There is no particular limitation for a method of applying a chemical conversion agent according to the present embodiment to an aluminum heat exchanger in the step (a). Any methods such as the spray method and the dipping method may be used, but the step (a) is preferably performed by the dipping method since the aluminum heat exchanger has a complicated structure as described above. Further, the temperature of a chemical conversion agent in the step (a) is preferably 5 to 40° C. Moreover, the duration of the step (a) is preferably 5 to 600 seconds, more preferably 10 to 300 seconds. In a case where the chemical conversion coating film is formed by the chemical conversion step performed under the conditions satisfying those, a chemical conversion coating film having an excellent corrosion resistance and moisture resistance can be formed.

In a case where the chemical conversion agent according to the present embodiment is used in a chemical conversion of an aluminum heat exchanger, removal of an oxide film on the surface of the aluminum heat exchanger do not need to be carried out. According to the surface treatment method for an aluminum heat exchanger used in the present embodiment, in a case where the chemical conversion agent described above is applied on a surface of the aluminum heat exchanger, a chemical conversion coating film having a high barrier property, corrosion resistance and moisture resistance can be obtained even without removing an oxide film. Therefore, neither the pickling step nor the subsequent water-washing step needs to be provided, and the number of steps can be reduced in the surface treatment method for an aluminum heat exchanger used in the present embodiment.

The amount of the solid content in the chemical conversion coating film formed with the chemical conversion agent used in the present embodiment is preferably 5 to 3,000 mg/m$^2$, more preferably 30 to 1,000 mg/m$^2$. When these are satisfied, an aluminum heat exchanger having an more excellent corrosion resistance and moisture resistance can be obtained. Note that since the chemical conversion agent according to the present embodiment is a coating type chemical conversion agent as described above, the amount of the solid content of the chemical conversion agent applied on a surface of an aluminum heat exchanger will correspond to the amount of the solid content of the chemical conversion coating film.

The first drying step is a step of drying a chemical conversion coating film formed on the surface of the aluminum heat exchanger in the above chemical conversion step to form the chemical conversion coating film on the above surface. In the first drying step, the chemical conversion agent applied on the surface of the aluminum heat exchanger can be dried to allow polyvinyl alcohol or a derivative thereof to form cross-linking with a metal such as zirconium and vanadium, thereby fixing a metal such as zirconium in the chemical conversion coating film.

There is no particular limitation for a drying temperature and drying duration in the first drying step, but the drying temperature is preferably 100 to 220° C., more preferably 120 to 220° C. The drying duration is preferably 1 to 120 minutes. Film forming property tends to be insufficient in a case where the drying temperature is less than 100° C. while the resin tends to be susceptible to decomposition, resulting in a brittle film in a case where it is more than 220° C.

Metals such as zirconium and vanadium, which have a large specific gravity, tend to sink down to the surface of the aluminum heat exchanger within the chemical conversion coating film during dried in the first drying step. This is also one of the reasons why the metals such as zirconium and vanadium are disproportionately present in the surface of the aluminum heat exchanger. By covering the metals such as zirconium and vanadium which are disproportionately present in the chemical conversion coating film as described above with the resin (C), odor generation from the metals such as zirconium can be suppressed.

The surface treatment method for an aluminum heat exchanger used in the present embodiment comprises a step (b) of allowing a hydrophilic agent comprising a hydrophilic resin to contact with the above aluminum heat exchanger on the surface of which the chemical conversion coating film has been formed in the step (a).

The step (b) is a step of allowing the aluminum heat exchanger from the step (a) to contact with a hydrophilic agent. In this step, a hydrophilic coating film is formed on the chemical conversion coating film.

There is no particular limitation for a hydrophilic agent used in the hydrophilization step, and those publicly known can be used. hydrophilic agent s preferably used in the surface treatment method according to the present embodiment are those in which silica fine particles coated with a vinyl alcohol resin are dispersed in an aqueous medium.

Examples of silica fine particles include fumed silica and colloidal silica. Among these, fumed silica, which is manufactured, for example, by high temperature hydrolysis of halosilane such as trichlorosilane and tetrachlorosilane in the gas phase, represents fine particles with a large surface area. Further, colloidal silica represents those in which acid- or alkali-stable silica sol is dispersed in water. The volume average particle diameter of a silica fine particle is preferably 5 to 100 nm, more preferably 7 to 60 nm. In a case where the volume average particle diameter is less than 5 nm, unevenness in a treated film is insufficient resulting in decreased hydrophilicity. In a case where it is more than 100 nm, large-diameter aggregates tend to be produced when it is used as a treatment agent, resulting in poor workability. Note that the volume average particle diameter was obtained by diluting some of a hydrophilic agent with deionized water, and performing measurements with a dynamic light scattering measurement system (ELS-800, Otsuka Electronics Co., Ltd.).

A typical polyvinyl alcohol based resin is polyvinyl alcohol (PVA) obtained by saponificating a vinyl acetate polymer. A PVA having a high saponification degree is preferred, in particular a PVA having a saponification degree of 98% or more is preferred. Further, those in which a part of a derivative of PVA, for example, a hydroxy group is replaced with an alkyl group such as a propyl group and a butyl group; and a polyethylene glycol group can be used as a vinyl alcohol polymer. Further, along with a vinyl alcohol resin as a hydrophilic agent, other hydrophilic polymers, for example, a hydroxy group-including acrylic resin, polyacrylic acid, polyvinyl sulfonic acid, polyvinyl imidazole, polyethylene oxide, polyamide, water-soluble nylon and the like can also be used in combination in an amount of less than 50 mass % relative to the vinyl alcohol resin.

In order to manufacture the above hydrophilic agent, first, a vinyl alcohol resin (and other hydrophilic polymers, if desired. Hereinafter, it is referred to simply as a vinyl alcohol resin) is dissolved or dispersed to give 0.3 to 17.5 mass %, preferably 0.5 to 10 mass % relative to the hydrophilic agent. Then, to this, added are silica fine particles in an amount of 0.3 to 17.5 mass %, preferably 0.5 to 10 mass % relative to the hydrophilic agent.

Further, as other preparation methods, silica fine particles may be dispersed in an aqueous solution of a vinyl alcohol resin having a solid content concentration in the silica fine particles of 5 to 70 mass % to pre-coat the silica fine particles with the vinyl alcohol resin, and then an aqueous solution of the vinyl alcohol resin may be added to adjust the concentration.

The total content of the silica fine particles and the vinyl alcohol resin in a hydrophilic agent is preferably 0.2 to 25 mass %, more preferably 1 to 5 mass %. Note that the mass ratio of the silica particles and the vinyl alcohol resin is preferably 30:70 to 70:30, more preferably 40:60 to 60:40. In a case where the total mount of the above silica fine particles and the vinyl alcohol resin is less than 0.2 mass %, the effects of long-lasting hydrophilicity and deodorization are not achieved while in a case where it is more than 25 mass %, the viscosity is increased, resulting in worsened coating operability. Further, in a case where the mass ratio of the silica fine particles and the vinyl alcohol resin falls outside the range of 30:70 to 70:30, film formation is insufficient, and a film may be detached from silica and a base material to generate a dusty odor when the ratio of the silica fine particles is high while hydrophilicity is decreased when the ratio of the vinyl alcohol resin is high.

As described above, when the vinyl alcohol resin and the silica fine particles are mixed, aggregation occurs due to mutual interaction. Accordingly, the aggregates are forced to be dispersed using an ultrasonic dispersing device, a micro-medium dispersing device and the like. A dispersing device for simple mixing and dispersion such as a mixer can not disperse the aggregates, and those generating intense mixing effects such as a mill-like grinding function or ultrasound at a micro-region need to be used. Examples of such a dispersing device include an ultrasonic homogenizer available from NISSEI Corporation (the US series) and a Super Mill (HM-15) available from Inoue MFG., Inc. The aggregates dispersed forcibly in this way become coated particles with a mean particle diameter of 5 to 1,000 nm in which surfaces of the silica particles are coated with the vinyl alcohol resin, and are stabilized as dispersed substances in an aqueous medium. In a case where the mean particle diameter is less than 5 nm, hydrophilicity can not be obtained while in a case where it is more than 1,000 nm, coating operability is worsened.

When the above preferred hydrophilic agent is used, the hydrophilicity of a hydrophilic coating film can be assured by the unevenness in the silica fine particles. In addition, even in a case where a hydrophilic coating film somewhat deteriorates after prolonged use, the coated silica fine particles is unlikely to be directly exposed or washed away with condensed water. Therefore, the hydrophilic coating film has a highly long-lasting hydrophilicity. Further, when silica particles are coated, neither a dusty odor characteristic of silica nor an odor resulted from bacteria and the like adsorbed in silica is unlikely to be generated.

The hydrophilic agent used in the present embodiment is not limited to the above hydrophilic agents. In addition to the above hydrophilic agents. for example, a PVA solution and a solution of a PVA derivative which do not include silica particles, or a mixed solution thereof can also be used as the hydrophilic agent according to the present embodiment. Further, resin solutions other than a PVA solution, a solution of a PVA derivative or a mixed solution thereof can also be used as the hydrophilic agent according to the present embodiment. Examples of resin solutions other than a PVA solution, a solution of a PVA derivative or a mixed solution thereof which can be used as the hydrophilic agent according to the present embodiment include, for example, a mixed solution of carboxymethyl cellulose (CMC) and polyacrylic acid.

Various additives can be used in a hydrophilic agent, if desired. Examples of various additives include, for example, an antimicrobial agent, a lubricant, a surfactant, a pigment, a dye and a rust-resistance conferring inhibitor.

There is no particular limitation for a method of contacting a hydrophilic agent with a chemical conversion coating film in the hydrophilization step, and the dipping method, the spray method and the like can be used as in the chemical conversion step, but the dipping method is preferred since a heat exchanger has a complicated structure as described above. The temperature of a hydrophilic agent is preferably about 10 to 50° C., and the treatment duration is preferably about 3 seconds to 5 minutes. Further, the coating amount of a hydrophilic coating film can be adjusted by adjusting the adhesion amount of a hydrophilic coating film to be formed on a chemical conversion coating film. In the hydrophilization step, a hydrophilic coating film is preferably formed on a chemical conversion coating film so that the coating amount of the hydrophilic coating film will be 0.1 to 3 g/m$^2$ (preferably 0.2 to 1 g/m$^2$). In a case where the coating amount is less than 0.1 g/m$^2$, hydrophilizing performance is difficult to be obtained while in a case where it is more than 3 g/m$^2$, productivity tends to be decreased.

The surface treatment method for an aluminum heat exchanger used in the present embodiment comprises a step (c) (a second drying step) of forming a hydrophilizing coating film by performing a baking treatment on the aluminum heat exchanger which has been allowed to contact with the hydrophilic agent in the step (b).

There is no particular limitation for a baking temperature and baking duration in the second drying step, but the baking temperature is preferably 100 to 220° C., more preferably 150 to 200° C. The baking duration is preferably 10 to 60 minutes. In a case where the baking temperature is less than 100° C., film-forming property tends to be insufficient while in a case where it is more than 220° C., the durability of hydrophilicity tends to be decreased.

The present invention shall not be limited to the embodiments described above, and modifications and improvements are included in the present invention as long as the object of the present invention can be achieved.

EXAMPLES

Below, the present invention will be described in more detail with reference to Examples, but the present invention shall not be limited thereto. Note that Part(s), percentage(s), and ppm(s) are by mass unless otherwise specified.

[Preparation of Chemical Conversion Agent]

Pure water, a zirconium based compound (or a titanium based compound), a vanadium based compound, resins, a source of free fluorine and a surfactant are mixed so that the mass-based content of the metal element (A), the vanadium element (B), the resin (C1), the resin (C2) and the like in a chemical conversion agent are obtained according to the numerical values shown in Tables 1 to 3, thereby preparing the chemical conversion agents of Examples and Comparative Examples. Further, the pH of the chemical conversion agent was adjusted to the ranges shown in Tables 1 to 3 with a 25% aqueous solution of ammonia or a 67.5% nitric acid. The types of zirconium based compounds, vanadium based compounds, resins, sources of free fluorine and surfactants shown in Tables 1 to 3 are as follows. Note that the concentrations of sources of free fluorine in Tables 1 and 3 are in terms of fluorine element.

Compounds used as Sources of the Metal Element (A)
(a) Zirconium ammonium fluoride
(b) Zirconium acetate
(c) Tetra-n-propoxyzirconium
(d) Titanium ammonium fluoride Vanadium Based Compounds (Sources of the Vanadium Element (B))
(a) Vanadyl sulfate
(b) Ammonium metavanadate
(c) Triisopropoxy oxovanadium Resin (C1)
(a) PVA-110 (polyvinyl alcohol, saponification degree: 98 to 99%, polymerization degree: 1,000, Kuraray Co., Ltd.)
(b) PVA-105MC (polyvinyl alcohol, saponification degree: 98 to 99%, polymerization degree: 500, Kuraray Co., Ltd.)
(c) PVA-405 (polyvinyl alcohol, saponification degree: 80 to 83%, polymerization degree: 500, Kuraray Co., Ltd.)
(f) Gohsefimer Z-200 (acetoacetyl-modified polyvinyl alcohol, saponification degree: 99%, polymerization degree: 1,100, acetoacetyl group modification degree: 4 to 5mol %, Nippon Synthetic Chemical Industry Co., Ltd.)

(h) PVA-505 (polyvinyl alcohol, saponification degree: 72.5 to 74.5%, polymerization degree: 500, Kuraray Co., Ltd.)
Resin (C2)
(d) AC1OL (polyacrylic acid, Nippon Junyaku K. K.)
(e) Poly-NaSS PS-1 (polystyrene sulfonate, Tosoh Organic Chemical Co., Ltd.)
(g) PEO-1 (polyethylene glycol, Sumitomo Seika Chemicals Co., Ltd.)
(i) Polyvinyl phosphonic acid (polyvinyl phosphonic acid, Sigma Aldrich)
(j) PAA-15C (polyallylamine, Nittobo Medical Co.,Ltd.)
Sources of free fluorine
(a) Hydrofluoric acid
(b) Ammonium hydrogen fluoride
Surfactants
(a) Sodium lauryl sulfate (an anionic surfactant, Wako Pure Chemical Industries, Ltd.)
(b) Emulgen LS-110 (a non-ionic surfactant, Kao Corp.)
[Preparation of Evaluation Samples]

An evaporator was immersed into a chemical conversion agent (25° C.) from each of Example and Comparative Examples for 15 seconds to form a chemical conversion coating film on a surface of the evaporator. Here, the adhesion amount of the chemical conversion agent was adjusted so that the amount of solid contents in a chemical conversion coating film would be 0.2 g/m$^2$. The evaporator on the surface of which the chemical conversion coating film had been formed was dried under the conditions of 150° C. and for 30 minutes. The chemical conversion coating film was formed on the surface of the evaporator by this drying. Further, the evaporator on the surface of which the chemical conversion coating film had been formed was air-cooled for 30 minutes at the room temperature (25° C.)

The evaporator in which the chemical conversion coating film had been formed after air-cooling was immersed into each of the hydrophilic agents shown in Tables 1 to 3 for 30 seconds to form a hydrophilizing film on the chemical conversion coating film. This was then dried under the conditions of 150° C. and for 30 minutes to form a hydrophilic coating film on the chemical conversion coating film. As described above, evaluation samples of Examples and Comparative Examples shown in Tables 1 and 2 were obtained. The types of the hydrophilic treatment agents shown in Tables 1 to 3 are shown below.
Hydrophilizing Treatment Agents
(A) A mixture of PVA-105 (40 mass %, polyvinyl alcohol, saponification degree: 98 to 99%, Kuraray Co., Ltd.), EO-PVA (20 mass %, oxyalkylene group-including polyvinyl alcohol) and silica fine particles (40 mass %)
(B) A mixture of PVA-105 (30 mass %, polyvinyl alcohol, saponification degree: 98 to 99%, Kuraray Co., Ltd.) and EO-PVA (70 mass %, oxyalkylene group-including polyvinyl alcohol)
(C) A mixture of CMC Dicel 1120 (75 mass %, carboxymethyl cellulose, Daicel FineChem Ltd.) and Jurymer AC1OL (25 mass %, polyacrylic acid, Nippon Junyaku K. K.)
[Evaluation of Corrosion-Resistance (SST test)]

The evaluation sample obtained was set against a saltwater sprayer and allowed to stand for 240 hours, and then removed and washed with pure water. Subsequently, it was dried in a 80° C. drying furnace for 10 minutes, and then an area of white rust on a surface was visually evaluated in accordance with the following evaluation criteria. Evaluation was performed by two evaluators, and corrosion resistance was evaluated based on the mean value of the scores from the two evaluators. Evaluation results are shown in Tables 1 to 3. The acceptable level of the corrosion resistance evaluation is Score 7 or more in the STT test results.
(Evaluation Criteria)
10:No rust occurs.
9:Area where white rust occurs is less than 10%.
8:Area where white rust occurs is 10% or more and less than 20%.
7:Area where white rust occurs is 20% or more and less than 30%.
6:Area where white rust occurs is 30% or more and less than 40%.
5:Area where white rust occurs is 40% or more and less than 50%.
4:Area where white rust occurs is 50% or more and less than 60%.
3:Area where white rust occurs is 60% or more and less than 70%.
2:Area where white rust occurs is 70% or more and less than 80%.
1:Area where white rust occurs is 80% or more and less than 90%.
0:Area where white rust occurs is 90% or more.
[Evaluation of Moisture Resistance]

The evaluation samples obtained were subjected to moisture resistance tests of 500 hours under the atmosphere where the temperature was 70° C., and the relative humidity was 98% or more. An area where blackening rust developed was visually evaluated in accordance with the following evaluation criteria. Evaluation was performed by two evaluators, and moisture resistance was evaluated based on the mean value of the scores from the two evaluators. Note that blackening will in nature be transformed into white rust, and thus the sum of a blackening-developed area and a white rust-developed area was computed as a rust-developed area. Evaluation results are shown in Tables 1 to 3. The acceptable level of the moisture resistance evaluation is Score 7 or more in the moisture resistance test results.
(Evaluation Criteria)
10:No rust occurs.
9:Area where rust occurs is less than 10%.
8:Area where rust occurs is 10% or more and less than 20%.
7:Area where rust occurs is 20% or more and less than 30%.
6:Area where rust occurs is 30% or more and less than 40%.
5:Area where rust occurs is 40% or more and less than 50%.
4:Area where rust occurs is 50% or more and less than 60%.
3:Area where rust occurs is 60% or more and less than 70%.
2:Area where rust occurs is 70% or more and less than 80.
1:Area where rust occurs is 80% or more and less than 90%.
0:Area where rust occurs is 90% or more.
[Evaluation of Hydrophilicity]

Adhesive tapes were attached to and peeled from an evaluation sample and an deteriorated evaluation sample which had been immersed in pure water for one week at room temperature. Pure water in an amount of 2 pl was applied on a portion from which the tape was peeled, and a contact angle was measured. Measurements of contact angles were performed with an automatic contact angle measurement device "CA-Z" (Kyowa Interface Science Co., LTD.). Results are shown in Tables 1 to 3. Note that the unit of values shown in Tables 1 to 3 is "° ", and the acceptable level of the hydrophilicity evaluation is 20° or less.
[Evaluation of Adsorbed Odors]

The evaluation samples were immersed in water for 168 hours to deteriorate, and then each of the evaluation samples and 1 g of 1% aqueous acetic acid were placed in a 500 cm$^3$ container, and allowed to stand for 30 minutes. The evaluation samples were removed from the containers, and then evaluated by smelling in terms of 6 levels. Evaluation was performed by two evaluators, and adsorbed odors were evaluated based on the mean value of scores from the two evaluators. Results are shown in Tables 1 to 3. Note that the acceptable level is Score 2 or below for the odor evaluation. Score 0: No odor Score 1: A very weak odor is sensed. Score 2: A weak odor is sensed. Score 3: An odor is sensed. Score 4: A strong odor is sensed. Score 5: A very strong odor is sensed.

TABLE 1

| | | | Example | | | | | | | | | | | | |
|---|---|---|---|---|---|---|---|---|---|---|---|---|---|---|---|
| | | | 1 | 2 | 3 | 4 | 5 | 8 | 7 | 8 | 9 | 10 | 11 | 12 |
| Chemical conversion agent | Metal element (A) | Concentration (ppm) | 2000 | 2000 | 2000 | 2000 | 400 | 2865 | 4500 | 4500 | 10000 | 10000 | 4000 | 4000 |
| | | Type | a | d | b | c | a | a | a | a | a | a | a | a |
| | Vanadium element (B) | Concentration (ppm) | 1500 | 1500 | 1500 | 1500 | 2300 | 699 | 681 | 480 | 681 | 681 | 3200 | 3200 |
| | | Type | a | a | a | a | a | b | b | c | a | a | a | a |
| | Resin (C1) | Concentration (ppm) | 4000 | 4000 | 4000 | 4000 | 5000 | 4100 | 5000 | 5000 | 10000 | 10000 | 500 | 500 |
| | | Type | a | a | a | a | b | c | a | a | b | b | b | b |
| | Resin (C2) | Concentration (ppm) | — | — | — | — | — | — | — | — | — | — | — | — |
| | | Type | — | — | — | — | — | — | — | — | — | — | — | — |
| | Source of free fluorine | Concentration (ppm) | — | — | — | — | — | — | — | — | — | 500 | — | 5000 |
| | | Type | — | — | — | — | — | — | — | — | — | a | — | b |
| | Surfactant | Concentration (ppm) | — | — | — | — | — | — | — | — | — | — | — | — |
| | | Type | — | — | — | — | — | — | — | — | — | — | — | — |
| | Wa/Wb | | 1.33 | 1.33 | 1.33 | 1.33 | 0.17 | 4.10 | 6.61 | 9.38 | 14.68 | 14.68 | 1.25 | 1.25 |
| | (Wa + Wb)/Wc | | 0.88 | 0.88 | 0.88 | 0.88 | 0.54 | 0.87 | 1.04 | 1.00 | 1.07 | 1.07 | 14.40 | 14.40 |
| | Wc2/(Wc1 + Wc2) | | 0 | 0 | 0 | 0 | 0 | 0 | 0 | 0 | 0 | 0 | 0 | 0 |
| | pH | | 2.5 | 2.5 | 2.5 | 2.5 | 2.5 | 2.5 | 5.0 | 6.5 | 2.5 | 2.5 | 2.5 | 2.5 |
| Type of hydrophilizing agent | | | A | A | A | A | A | A | A | A | A | A | A | A |
| Evaluation results | SST | | 10 | 9 | 9 | 9 | 9 | 10 | 10 | 10 | 10 | 10 | 10 | 10 |
| | Moisture resistance tests | | 10 | 9 | 9 | 9 | 10 | 9 | 9 | 8 | 7 | 8 | 7 | 8 |
| | Adsorbed odor | | 1.5 | 1.5 | 1.5 | 1.5 | 1.5 | 1.5 | 1.5 | 1.5 | 2 | 2 | 2 | 2 |
| | Hydrophilicity (contact angle) | | 19 | 19 | 19 | 19 | 18 | 19 | 19 | 19 | 19 | 19 | 17 | 17 |

| | | | Example | | | | | | | | | | | | |
|---|---|---|---|---|---|---|---|---|---|---|---|---|---|---|---|
| | | | 13 | 14 | 15 | 16 | 17 | 18 | 19 | 20 | 21 | 22 | 23 | 24 |
| Chemical conversion agent | Metal element (A) | Concentration (ppm) | 4000 | 4000 | 3725 | 1000 | 930 | 180 | 494 | 663 | 930 | 2000 | 2000 | 2000 |
| | | Type | a | a | a | a | a | a | a | a | a | a | b | a |
| | Vanadium element (B) | Concentration (ppm) | 3200 | 3200 | 2726 | 800 | 681 | 120 | 362 | 484 | 681 | 1500 | 1500 | 1500 |
| | | Type | a | a | a | a | a | a | a | a | a | a | b | a |
| | Resin (C1) | Concentration (ppm) | 500 | 500 | 1200 | 5000 | 6000 | 625 | 1625 | 1325 | 500 | 4000 | 4000 | 4000 |
| | | Type | b | b | c | a | a | a | a | a | a | c | a | f |
| | Resin (C2) | Concentration (ppm) | — | — | — | — | — | — | — | — | — | — | — | — |
| | | Type | — | — | — | — | — | — | — | — | — | — | — | — |
| | Source of free fluorine | Concentration (ppm) | 10000 | 20000 | — | — | — | — | — | — | — | — | — | — |
| | | Type | b | b | — | — | — | — | — | — | — | — | — | — |
| | Surfactant | Concentration (ppm) | — | — | — | — | — | — | — | — | — | — | — | — |
| | | Type | — | — | — | — | — | — | — | — | — | — | — | — |
| | Wa/Wb | | 1.25 | 1.25 | 1.37 | 1.25 | 1.37 | 1.50 | 1.37 | 1.37 | 1.37 | 1.33 | 1.33 | 1.33 |
| | (Wa + Wb)/Wc | | 14.40 | 14.40 | 5.38 | 0.36 | 0.27 | 0.48 | 0.53 | 0.87 | 3.22 | 0.88 | 0.88 | 0.88 |
| | Wc2/(Wc1 + Wc2) | | 0 | 0 | 0 | 0 | 0 | 0 | 0 | 0 | 0 | 0 | 0 | 0 |
| | pH | | 2.5 | 2.5 | 1.5 | 2.5 | 3.0 | 3.0 | 3.0 | 3.0 | 3.0 | 3.0 | 7.5 | 30 |

TABLE 1-continued

| Type of hydrophilizing agent | A | A | A | A | A | A | A | A | A | A | A | A |
|---|---|---|---|---|---|---|---|---|---|---|---|---|
| Evaluation results — SST | 10 | 10 | 8 | 9 | 9 | 8 | 9 | 10 | 10 | 9 | 7 | 9 |
| Moisture resistance tests | 8 | 8 | 8 | 9 | 8 | 9 | 9 | 10 | 10 | 7 | 7 | 9 |
| Adsorbed odor | 2 | 2 | 1.5 | 1.5 | 1.5 | 1.5 | 1.5 | 1.5 | 1.5 | 1.5 | 1.5 | 1.5 |
| Hydrophilicity (contact angle) | 17 | 17 | 17 | 20 | 19 | 19 | 17 | 17 | 19 | 16 | 16 | 16 |

TABLE 2

| | | | Example | | | | | | | | | | |
|---|---|---|---|---|---|---|---|---|---|---|---|---|---|
| | | | 25 | 26 | 27 | 28 | 29 | 30 | 31 | 32 | 33 | 34 | 35 |
| Chemical conversion agent | Metal element (A) | Concentration (ppm) | 2000 | 2000 | 663 | 2000 | 2000 | 663 | 2000 | 2000 | 2000 | 663 | 2000 |
| | | Type | a | a | a | a | a | a | a | a | a | a | a |
| | Vanadium element (B) | Concentration (ppm) | 1500 | 1500 | 484 | 1500 | 1500 | 484 | 1500 | 1500 | 1500 | 484 | 1500 |
| | | Type | a | a | a | a | a | a | a | a | a | a | a |
| | Resin (C1) | Concentration (ppm) | 3600 | 3600 | 3600 | 3200 | 3200 | 3200 | 2400 | 2400 | 2400 | 2400 | 3600 |
| | | Type | a | a | a | a | a | a | a | a | a | a | a |
| | Resin (C2) | Concentration (ppm) | 400 | 400 | 400 | 800 | 800 | 800 | 1600 | 1600 | 1600 | 1600 | 400 |
| | | Type | d | i | j | d | i | j | d | d | i | j | e |
| | Source of free flourine | Concentration (ppm) | — | — | — | — | — | — | — | 500 | — | — | — |
| | | Type | — | — | — | — | — | — | — | a | — | — | — |
| | Surfactant | Concentration (ppm) | — | — | — | — | — | — | — | — | — | — | — |
| | | Type | — | — | — | — | — | — | — | — | — | — | — |
| | Wa/Wb | | 1.33 | 1.33 | 1.33 | 1.33 | 1.33 | 1.33 | 1.33 | 1.33 | 1.33 | 1.33 | 1.33 |
| | (Wa + Wb)/Wc | | 0.97 | 0.97 | 0.32 | 1.09 | 1.09 | 0.36 | 1.46 | 1.46 | 1.46 | 0.48 | 0.97 |
| | Wc2/(Wc1 + Wc2) | | 0.10 | 0.10 | 0.10 | 0.20 | 0.20 | 0.20 | 0.40 | 0.40 | 0.40 | 0.40 | 0.10 |
| | pH | | 3 | 3 | 3 | 3 | 3 | 3 | 3 | 3 | 3 | 3 | 3 |
| Type of hydrophilizing agent | | | A | A | A | A | A | A | A | A | A | A | A |
| Evaluation results | SST | | 10 | 10 | 10 | 8 | 9 | 9 | 7 | 8 | 7 | 7 | 7 |
| | Moisture resistance tests | | 10 | 10 | 10 | 8 | 9 | 9 | 7 | 8 | 7 | 7 | 7 |
| | Adsorbed odor | | 1.5 | 1.5 | 5 | 1.5 | 1.5 | 1.5 | 2 | 2 | 2 | 2 | 2 |
| | Hydrophilicity (contact | | 17 | 17 | 18 | 16 | 18 | 13 | 20 | 20 | 19 | 17 | 20 |

| | | | Example | | | | | | | | | | |
|---|---|---|---|---|---|---|---|---|---|---|---|---|
| | | | 36 | 37 | 38 | 39 | 40 | 41 | 42 | 43 | 44 | 45 |
| Chemical conversion agent | Metal element (A) | Concentration (ppm) | 2000 | 2000 | 2000 | 2000 | 2000 | 4500 | 4500 | 2000 | 2000 | 2000 |
| | | Type | a | a | a | a | a | a | a | b | a | a |
| | Vanadium element (B) | Concentration (ppm) | 1500 | 1500 | 1500 | 1500 | 1500 | 3200 | 3200 | 1500 | 1500 | 1500 |
| | | Type | b | b | b | b | a | a | a | b | a | a |
| | Resin (C1) | Concentration (ppm) | 3600 | 3600 | 3600 | 3600 | 4000 | 10000 | 10000 | 4000 | 4000 | 4000 |
| | | Type | a | a | a | a | h | a | a | h | a | a |
| | Resin (C2) | Concentration (ppm) | 400 | 400 | 400 | 400 | — | — | — | — | — | — |
| | | Type | g | g | g | g | — | — | — | — | — | — |
| | Source of free flourine | Concentration (ppm) | — | 5000 | 10000 | 20000 | — | — | — | — | — | — |
| | | Type | — | b | b | b | — | — | — | — | — | — |

TABLE 2-continued

|  |  |  |  |  |  |  |  |  |  |  |  |
|---|---|---|---|---|---|---|---|---|---|---|---|
|  | Surfactant | Concentration (ppm) | — | — | — | — | 350 | 350 | — | — | — |
|  |  | Type | — | — | — | — | a | b | — | — | — |
|  | Wa/Wb |  | 1.69 | 1.69 | 1.69 | 1.69 | 1.33 | 1.33 | 1.33 | 1.33 | 1.33 | 1.33 |
|  | (Wa + Wb)/Wc |  | 0.97 | 0.97 | 0.97 | 0.97 | 0.88 | 0.77 | 0.77 | 0.88 | 0.88 | 0.88 |
|  | Wc2/(Wc1 + Wc2) |  | 0.10 | 0.10 | 0.10 | 0.10 | 0 | 0 | 0 | 0 | 0 | 0 |
|  | pH |  | 3 | 3 | 3 | 3 | 2.5 | 3 | 3 | 3 | 2.5 | 2.5 |
| Type of hydrophilizing agent |  |  | A | A | A | A | A | A | A | A | B | C |
| Evaluation results | SST |  | 7 | 9 | 9 | 9 | 7 | 10 | 10 | 7 | 10 | 10 |
|  | Moisture resistance tests |  | 7 | 8 | 8 | 8 | 7 | 10 | 10 | 7 | 10 | 10 |
|  | Adsorbed odor |  | 1.5 | 1.5 | 1.5 | 1.5 | 2 | 1.5 | 1.5 | 2 | 1.5 | 2 |
|  | Hydrophilicity (contact |  | 18 | 18 | 18 | 18 | 16 | 18 | 18 | 20 | 20 | 19 |

TABLE 3

|  |  |  | Comparative Example |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| Chemical conversion agent | Metal element (A) | Concentration (ppm) | 260 | — | 300 | 300 | 2000 | 3300 | 2000 | 3500 | — | 2000 |
|  |  | Type | a | — | a | b | a | a | a | a | — | a |
|  | Vanadium element (B) | Concentration (ppm) | 3240 | 3500 | 220 | 220 | 1500 | 200 | 1500 | — | — | 1500 |
|  |  | Type | a | a | a | a | a | a | a | — | — | a |
|  | Resin (C1) | Concentration (ppm) | 4000 | 4000 | 4000 | 4000 | — | 4000 | 210 | 4000 | 4000 | — |
|  |  | Type | a | a | a | a | — | a | a | b | a | — |
|  | Resin (C2) | Concentration (ppm) | — | — | — | — | — | — | — | — | — | 4000 |
|  |  | Type | — | — | — | — | — | — | — | — | — | d |
|  | Source of free fluorine | Concentration (ppm) | — | — | — | — | — | — | — | — | — | — |
|  |  | Type | — | — | — | — | — | — | — | — | — | — |
|  | Surfactant | Concentration (ppm) | — | — | — | — | — | — | — | — | — | — |
|  |  | Type | — | — | — | — | — | — | — | — | — | — |
|  | Wa/Wb |  | 0.08 | — | 1.25 | 1.25 | 1.37 | 16.50 | 1.33 | — | — | 1.33 |
|  | (Wa + Wb)/Wc |  | 0.88 | 0.88 | 0.13 | 0.13 | — | 0.88 | 16.67 | 0.88 | — | 0.88 |
|  | Wc2/(Wc1 + Wc2) |  | 0 | 0 | 0 | 0 | 0 | 0 | 0 | 0 | 0 | 1 |
|  | pH |  | 2.5 | 2.5 | 3 | 3 | 2.5 | 2.5 | 2.5 | 3 | 3 | 2.5 |
| Type of hydrophilizing agent |  |  | A | A | A | A | A | A | A | A | A | A |
| Evaluation results | SST |  | 6 | 5 | 4 | 3 | 8 | 6 | 8 | 5 | 1 | 5 |
|  | Moisture resistance tests |  | 6 | 6 | 6 | 4 | 6 | 4 | 6 | 5 | 3 | 6 |
|  | Adsorbed odor |  | 2 | 2 | 2 | 1.5 | 2 | 1.5 | 1.5 | 1.5 | 2 | 3 |
|  | Hydrophilicity (contact angle) |  | 19 | 17 | 20 | 18 | 18 | 22 | 22 | 22 | 18 | 16 |

As clearly shown in Tables 1 to 3, an excellent corrosion resistance and moisture resistance can be conferred on a chemical conversion coating film, and odors can be suppressed in a case where a chemical conversion agent is used, wherein the chemical conversion agent comprises one, or two or more metal elements (A) selected from the group consisting of zirconium, titanium and hafnium; vanadium element (B) and a resin (C), wherein the resin (C) comprises a polyvinyl alcohol based resin (C1) comprising at least of one of polyvinyl alcohol and a derivative thereof, and the value of a ratio (Wa/Wb) of the mass-based total content (Wa) of the metal element (A) to the mass-based total content (Wb) of the vanadium element (B) is 0.1 to 15, and the value of a ratio ((Wa+Wb)/Wc1) of the mass-based total content (Wa+Wb) of the metal element (A) and the vanadium element (B) to the mass-based total content (Wc1) of the polyvinyl alcohol based resin (C1) is 0.25 to 15.

INDUSTRIAL APPLICABILITY

The surface treatment method for an aluminum heat exchanger according to the present invention can confer an excellent corrosion resistance and moisture resistance on the aluminum heat exchanger as compared with the conventional method, and also can suppress odors. Therefore, the surface treatment method for an aluminum heat exchanger according to the present invention can preferably be used for a surface treatment of an aluminum heat exchanger in an air conditioner.

The invention claimed is:

1. A surface treatment method for an aluminum heat exchanger, the method comprising the steps of:
   (a) treating a surface of the aluminum heat exchanger with a chemical conversion agent to form a chemical conversion coating film on the surface of the aluminum heat exchanger,
   (b) allowing the aluminum heat exchanger on the surface of which the chemical conversion coating film has been formed in the step (a) to contact with a hydrophilic agent including a hydrophilic resin, and
   (c) performing a baking treatment on the aluminum heat exchanger which has been allowed to contact with the hydrophilic agent in the step (b) to form a hydrophilizing coating film,
   wherein the chemical conversion agent comprises one, or two or more metal elements (A) selected from the group consisting of zirconium, titanium and hafnium,
   vanadium element (B), and
   a resin (C), and
   the resin (C) comprises a polyvinyl alcohol based resin (C1) comprising at least of one of polyvinyl alcohol and a derivative thereof, and
   the value of a ratio (Wa/Wb) of the mass-based total content (Wa) of the metal element (A) to the mass-based content (Wb) of the vanadium element (B) is 0.1 to 15, and
   the value of a ratio ((Wa+Wb)/Wc1) of the mass-based total content (Wa+Wb) of the metal element (A) and the vanadium element (B) to the mass-based total content (Wc1) of the polyvinyl alcohol based resin (C1) is 0.25 to 15.

2. The surface treatment method for an aluminum heat exchanger according to claim 1, wherein the resin (C) further comprises one, or two or more metal ion-cross linkable polymers (C2), and wherein the value of a ratio (Wc2/(Wc1+Wc2)) of the mass-based total content (Wc2) of the metal ion-cross linkable polymer (C2) to the mass-based total content (Wc1+Wc2) of the polyvinyl alcohol based resin (C1) and the metal ion-cross linkable polymer (C2) is 0.4 or less.

3. The surface treatment method for an aluminum heat exchanger according to claim 2, wherein the chemical conversion agent comprises one, or two or more selected from the group consisting of polyacrylic acid, phosphoric acid polymer, phosphonic acid polymer, water-soluble or water-dispersible epoxy polymer, water-soluble or water-dispersible urethane based polymer and polyester as the metal ion-cross linkable polymer (C2).

4. The surface treatment method for an aluminum heat exchanger according to claim 1, wherein the total concentration of the metal element (A) in the chemical conversion agent is 50-100,000 ppm by mass, and the concentration of the vanadium element (B) is 50-100,000 ppm by mass, and the total concentration of the resin (C) is 50-100,000 ppm by mass, and pH is 0.5-6.5.

5. The surface treatment method for an aluminum heat exchanger according to claim 1, wherein the average saponification degree of the polyvinyl alcohol based resin (C1) is 80% or more.

6. The surface treatment method for an aluminum heat exchanger according to claim 1, wherein the chemical conversion agent further comprises a surfactant.

7. The surface treatment method for an aluminum heat exchanger according to claim 1, wherein the chemical conversion agent further comprises one, or two or more sources of free fluorine selected from the group consisting of hydrofluoric acid, ammonium fluoride, ammonium hydrogendifluoride and fluorides of alkali metals.

* * * * *